(12) United States Patent
Rogalski et al.

(10) Patent No.: US 7,030,818 B2
(45) Date of Patent: Apr. 18, 2006

(54) SYSTEM AND METHOD FOR WIRELESS DEVICE

(75) Inventors: Gary Rogalski, Richmond (CA); Kent Wong, New Territory (HK); Kenny Che, Vancouver (CA); Damien Yat Shun Yu, Burnaby (CA)

(73) Assignee: VTech Telecommunications Limited, Tai Po New Territory (HK)

( * ) Notice: Subject to any disclaimer, the term of this patent is extended or adjusted under 35 U.S.C. 154(b) by 9 days.

(21) Appl. No.: 10/768,245

(22) Filed: Feb. 2, 2004

(65) Prior Publication Data

US 2005/0168386 A1   Aug. 4, 2005

(51) Int. Cl.
*H01Q 1/24*   (2006.01)
(52) U.S. Cl. ..................................... 343/702
(58) Field of Classification Search ................ 343/702, 343/900, 901, 718, 793, 795, 897; 455/89, 455/90.3, 575.1, 575.4, 90
See application file for complete search history.

(56) References Cited

U.S. PATENT DOCUMENTS 5,166,695 A * 11/1992 Chan et al. ................. 343/702
6,239,754 B1 * 5/2001 Kim ............................ 343/702
6,429,817 B1 * 8/2002 Creigh et al. ................ 343/702
6,473,046 B1 * 10/2002 Dickie et al. ................ 343/702
6,842,150 B1 * 1/2005 Wei ............................ 343/702
2004/0051671 A1   3/2004 Wei ............................ 343/702
2004/0198477 A1 * 10/2004 Jung et al. ................ 455/575.4

FOREIGN PATENT DOCUMENTS

| EP | 0650282 A1 | 4/1995 |
| GB | 2339970 A | 2/2000 |
| GB | 2350516 A | 11/2000 |
| GB | 2358088 A | 11/2001 |
| JP | 2004/032817 A | 1/2004 |

OTHER PUBLICATIONS

GB Search Report, Apr. 27, 2005.

* cited by examiner

*Primary Examiner*—Hoang V. Nguyen
(74) *Attorney, Agent, or Firm*—Pillsbury Winthrop Shaw Pittman LLP

(57) ABSTRACT

A method uses a rack and gear system for retracting an antenna when a wireless device is opened. Particularly, sliding a cover to open the device moves first and second sliding racks attached on opposite sides of the sliding cover. The racks drive a first gear and a second gear, respectively. The first gear drives an antenna rack. An antenna is attached to the antenna rack, such that driving an antenna rack extends or retracts the cover.

20 Claims, 6 Drawing Sheets

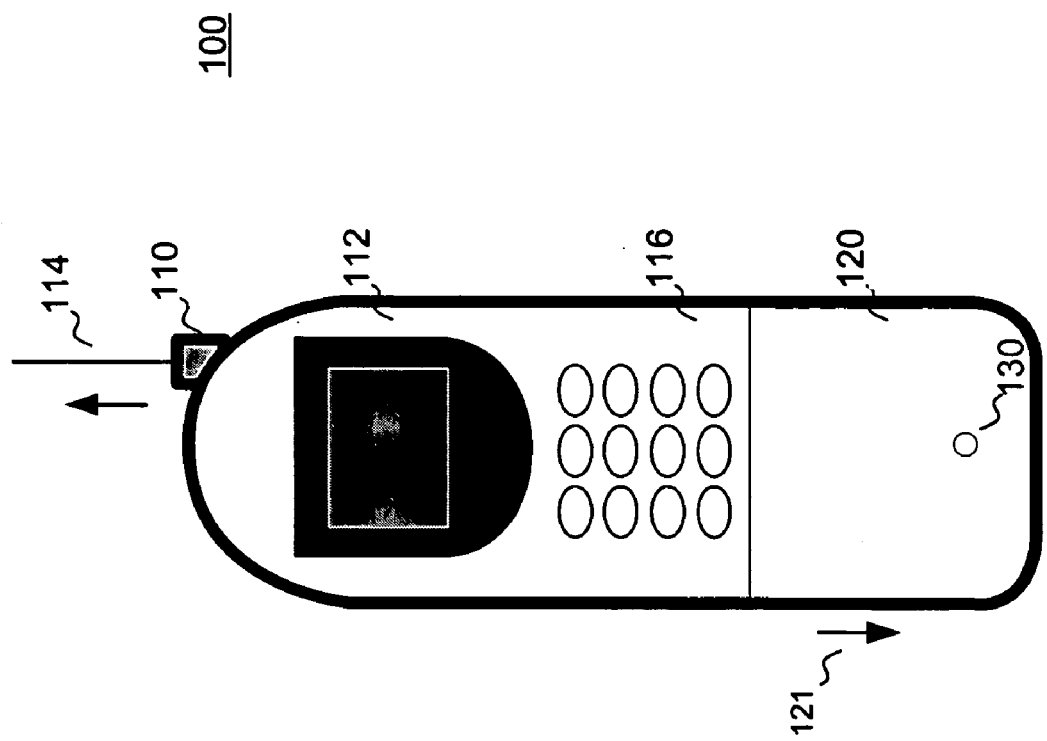
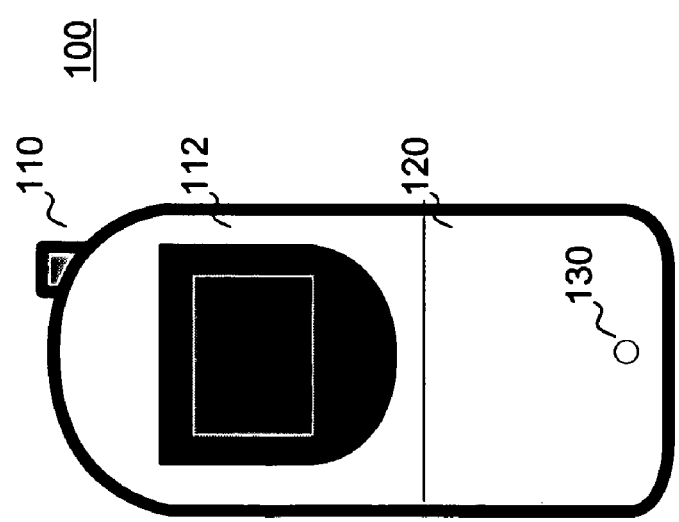
Fig 1B
Fig 1A

SYSTEM AND METHOD FOR WIRELESS DEVICE

BACKGROUND

1. Field of the Invention

The present invention relates generally to wireless devices. More specifically, the present invention is directed to synchronizing moving parts on a wireless device.

2. Background of the Invention

Wireless devices, such as cellular, mobile telephones and laptops, continue to be made smaller. The smaller devices are less bulky and easier to carry for the user. However, problems also arise as a result of the miniaturization.

For example, a cordless telephone or cell telephone may be so small that the microphone is located far away from a user's mouth. Similarly, the users head may block a large portion of the antenna radiation. Thus, a sliding cover may be required to extend the location to the user's mouth. Also, an antenna may need to be extendable.

A user may have to perform two operations, for example, sliding a cover and extending an antenna. However, this procedure of moving two parts at two different times is awkward and time consuming. Further, the antenna may become too small to easily extend by hand.

Laptops, BLACKBERRIES, PDAs and other devices, which connect to the Internet or another device wirelessly, also may have multiple parts that need to be moved. For example, a laptop may have a flip cover that needs to be opened and an antenna that needs to be extended to connect to a wireless network.

Thus, what is needed is a system and method for synchronizing moving parts of a wireless device.

BRIEF SUMMARY OF THE INVENTION

The present invention provides a wireless device with a rack and gear system for retracting an antenna when a wireless device is opened. The device includes a cover, an antenna, and a rack and gear system synchronizing movement of the antenna and cover.

The rack and gear system includes a first sliding front rack attached to a first side of the cover and a second sliding front rack attached to a second side of the cover. It also includes first and second gears attached to the first and second sliding front rack, respectively. The second gear attaches to the second front rack and the first gear. The first gear drives an antenna rack. The antenna is driven in the same direction as the antenna rack.

In one exemplary embodiment of the present invention, movement of the cover causes the first and second sliding racks to drive the first and second gears. The first gear then drives the antenna rack. In another exemplary embodiment of the present invention, the cover is a flip-top cover. The action of flipping the cover drives an antenna rack attached to the antenna. Again, the antenna moves in the same direction as the antenna rack.

BRIEF DESCRIPTION OF THE DRAWINGS

FIGS. 1A and 1B are schematic diagrams showing a wireless device according to an exemplary embodiment of the present invention.

DETAILED DESCRIPTION OF THE INVENTION

Figure 2B:
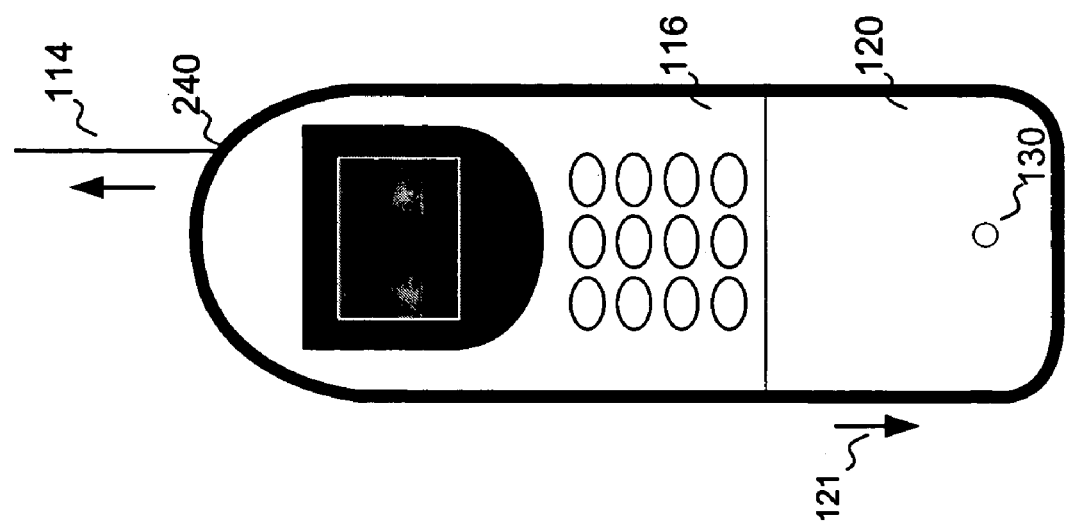
FIGS. 2A and 2B are schematic diagrams showing a wireless device according to another exemplary embodiment of the present invention.

This invention uses a rack and gear system for retracting an antenna when a wireless device is opened. In a preferred embodiment, the method synchronizes sliding a microphone or mouthpiece with extending an antenna. In an alternative embodiment, the method synchronizes flipping a cover with extending an antenna.

FIGS. 1A and 1B are schematic diagrams showing a wireless device according to an exemplary embodiment of the present invention. FIG. 1A shows a wireless telephone 100, such as a mobile telephone, cellular telephone, or cordless telephone, in a closed state. The wireless telephone 100 includes a protrusion 110 housing a partially extended antenna 114 (see FIG. 1B), an earpiece 112, and a cover 120. Cover 120 includes a microphone hole 130. In the closed position, cover 120 covers a keypad.

FIG. 1B shows wireless telephone 100 in an open state. When a user slides cover 120 down in direction 121, keypad 116 is exposed. At the same time, antenna 114 extends from protrusion 110. In the open position, microphone hole 130 is positioned closer to the user's mouth and antenna 114 is extended further away from the user's head.

Figure 2A:
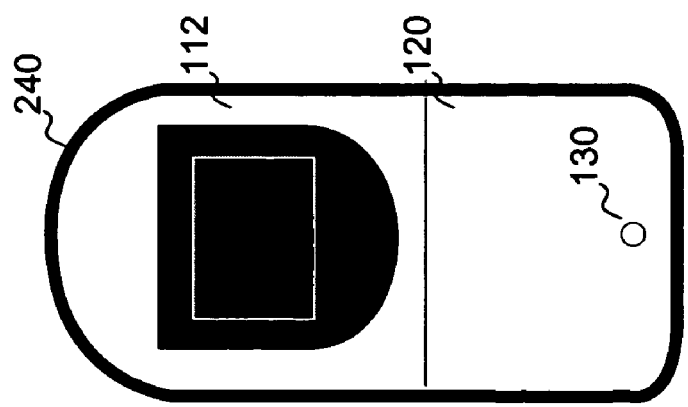

FIGS. 2A and 2B are schematic diagrams showing a wireless device according to another exemplary embodiment of the present invention. FIGS. 2A and 2B are the same as FIGS. 1A and 1B, respectively, except that hole 240 replaces protrusion 110. Thus, FIGS. 2A and 2B show that wireless telephone 100 may include a fully retractable antenna 114, instead of a partially retracted antenna. FIG. 2A shows that in the closed state, antenna 114 (not shown) is fully retracted in hole 240. In contrast, FIG. 2B shows that sliding cover 120 downward extends antenna 114 from a fully retracted state at hole 240 to a fully extended state.

Figure 3:
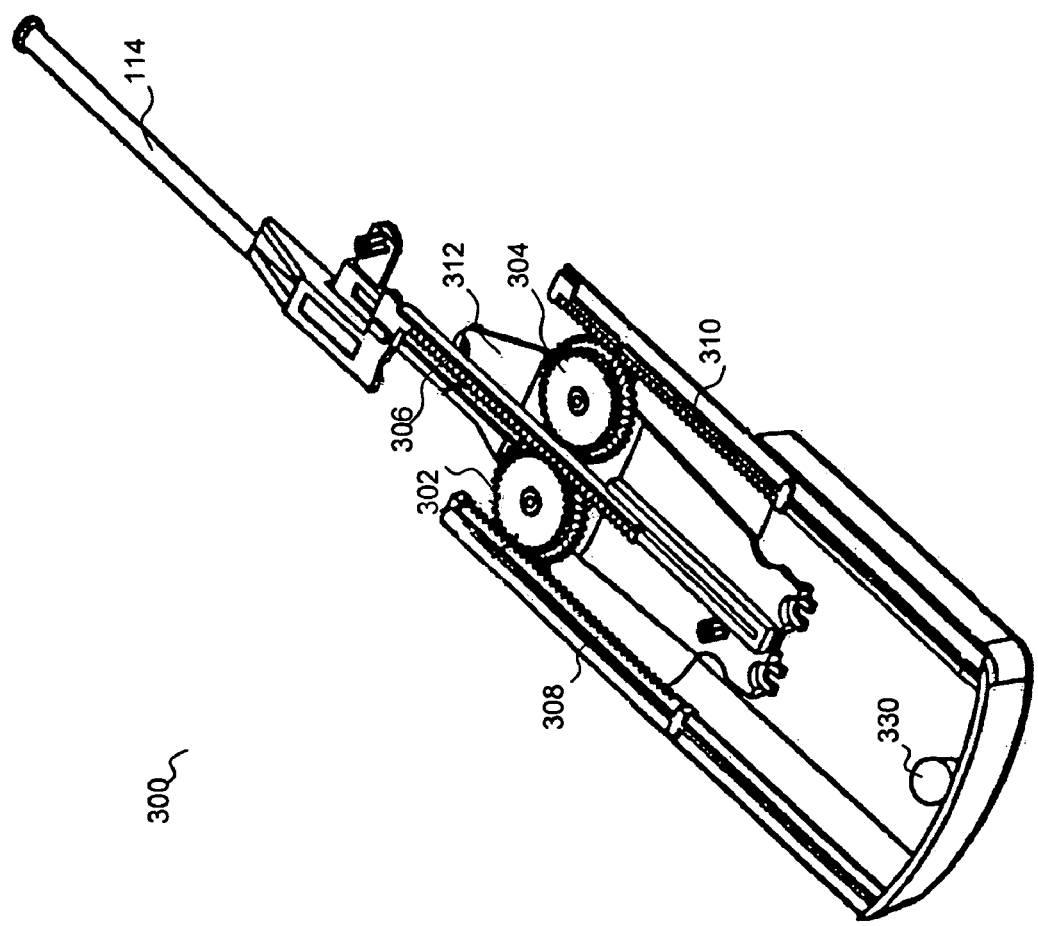
FIG. 3 is a schematic diagram showing a gear system of a wireless device according to an exemplary embodiment of the present invention.

FIG. 3 is a schematic diagram showing a gear system of a wireless device according to an exemplary embodiment of the present invention. Particularly, FIG. 3 shows a gear system 300 for operating the device of FIGS. 1A through 2B. Gear system 300 includes gears 302 and 304, antenna rack 306, sliding front racks 308 and 310, and gear bracket 312. Gear bracket 312 fixes gears 302 and 304 to the handset body of telephone 100. Gear 302 connects to antenna rack 306, sliding front rack 308 and gear 304. Likewise, gear 304 connects to sliding front rack 310 and gear 302. Sliding front racks 308 and 310 attach to sliding cover 120, and antenna rack 306 connects to antenna 114. Microphone 330 is a microphone that rests below microphone hole 130.

Gear system 300 operates as follows. When a user slides cover 120, sliding front racks 308 and 310 drive gears 302 and 310, respectively. Gear 302 drives antenna rack 306, and the antenna is extended or retracted accordingly. For example, when a user pulls cover 120 downward in direction 121 exposing keypad 116, rack 308 moves downward, gear 302 spins counter-clockwise, and rack 306 moves upwards with antenna 114. Thus, pulling cover 120 to open the telephone extends antenna 114. Similarly, pushing cover 120 upward to cover keypad 116 moves rack 308 upward, spins gear 302 clockwise, and moves rack 306 downwards with antenna 114. Thus, when a user pushes cover to a close position, antenna 114 retracts.

Gear 304 balances the force of pulling so that the right and left side of cover 120 have the same tension. When the cover is opened and the antenna is fully extended, microphone 330, which lies beneath microphone hole 130, is the closest to the users mouth.

Although the above description describes sliding a cover to move an antenna, the present invention also encompasses the reverse operation. Particularly, a user may extend or retract antenna 114 by hand to slide cover 120 in the open or close position. Further, although the above description describes two sliding racks and two gears for balancing tension, in an alternative embodiment, an antenna may be retracted or extending using only one sliding rack and one gear. Thus, gear 304 and rack 310 are omitted in an alternative embodiment.

Figure 4B:
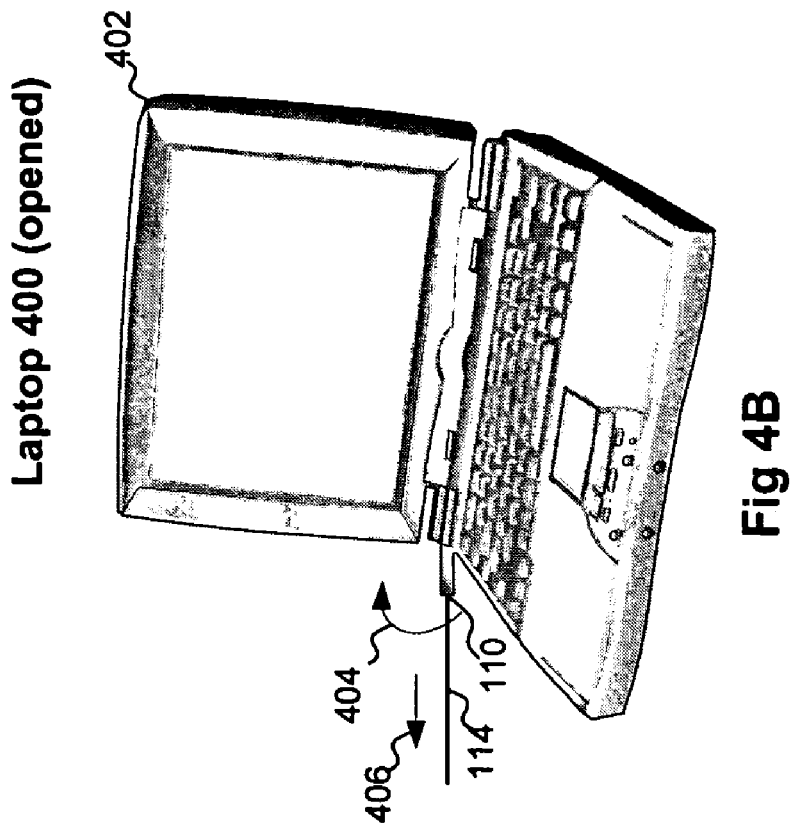
FIGS. 4A and 4B are schematic diagrams showing a wireless device according to an alternative exemplary embodiment of the present invention.
Figure 4A:
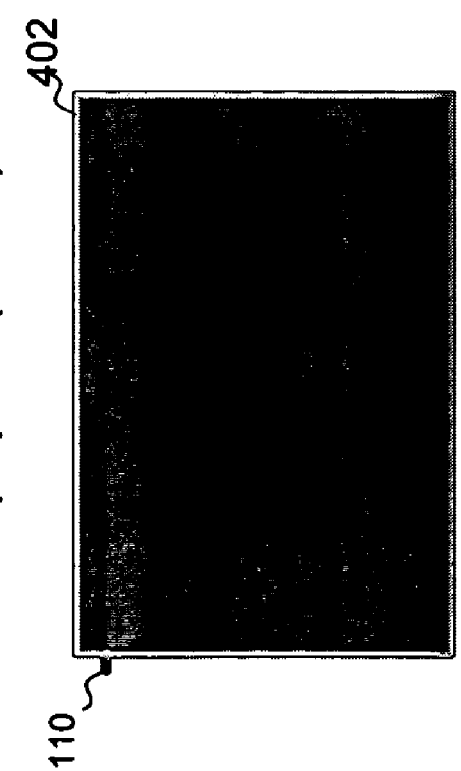

FIGS. 4A and 4B are schematic diagrams showing a wireless device according to an alternative exemplary embodiment of the present invention. Particularly, FIGS. 4A and 4B relate to synchronizing a cover that flips open with an extendable antenna. FIG. 4A shows a laptop 400 when cover 402 is closed. Although a laptop is shown in FIG. 4A, one of ordinary skill in the art will appreciate that any wireless device that flips open may be used. For example, device 400 may include a flip-top cell telephone or a PDA.

Laptop 400 may include protrusion 110 housing a partially extended antenna 114 (not shown). In another embodiment (not shown), laptop 400 may include hole 240 in lieu of protrusion 110, as described above in reference to FIGS. 2A and 2B. FIG. 4B shows laptop 400 when cover 402 is opened. Here, flipping cover 402 in rotation 404 causes antenna 114 to extend from protrusion 110 in direction 406. Similarly, closing cover 402 causes antenna 114 to retract into protrusion 110.

Figure 5:
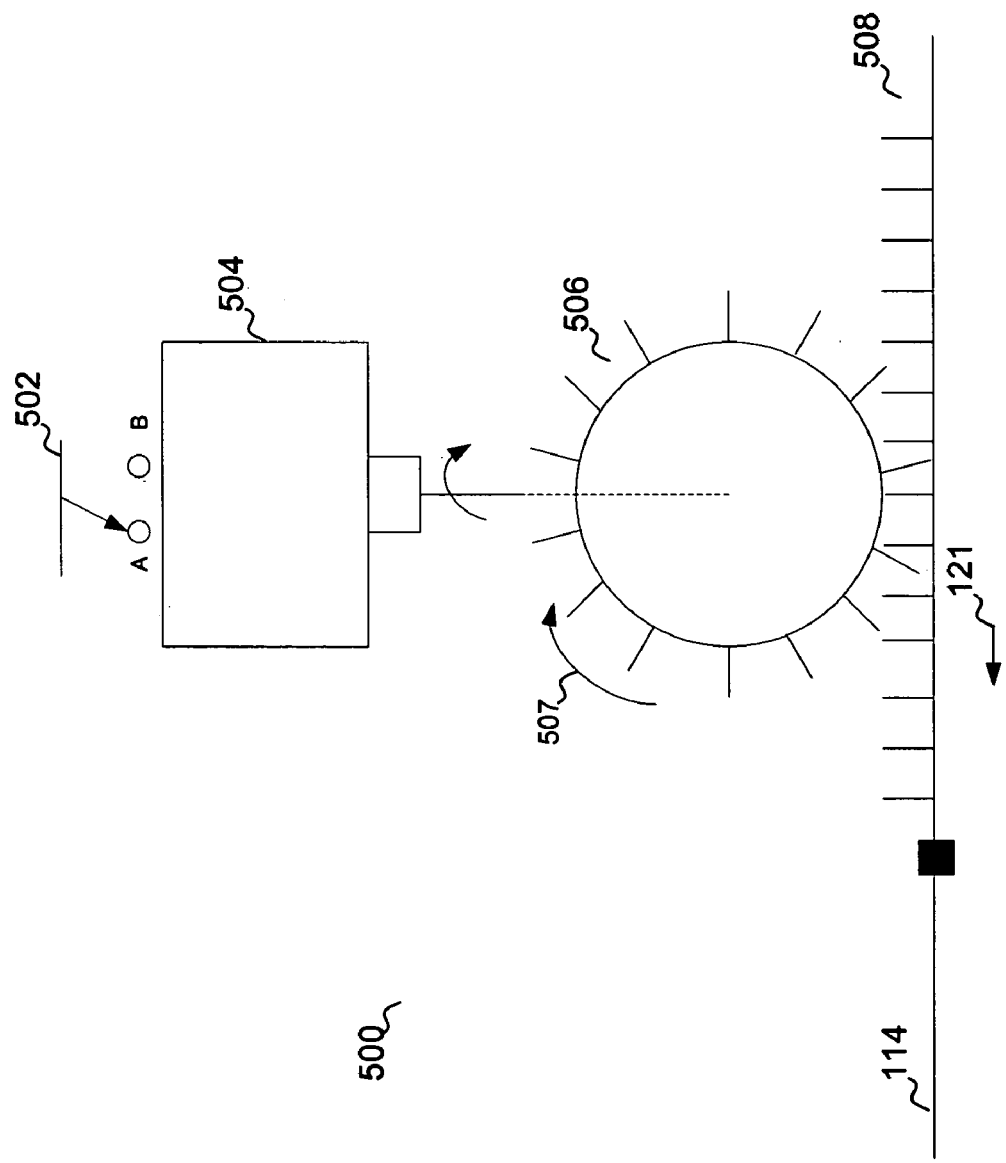
FIG. 5 is a schematic diagram showing a gear system of a wireless device according to an alternative exemplary embodiment of the present invention.

FIG. 5 is a schematic diagram showing a gear system of a wireless device according to an alternative exemplary embodiment of the present invention. Particularly, FIG. 5 shows gear system 500 for operating a wireless device with a flip top, as shown in the exemplary embodiment of FIGS. 4A and 4B. The gear system includes a bi-directional switch 502, a bi-directional motor 504, a gear 506, a rack 508 and antenna 114. Opening and closing wireless device 400 changes the state of switch 502 to position A or B. For example, opening laptop 400 closes switch 502 at the "A" position. Similarly, closing laptop 400 closes switch 502 closes at the "B" position.

Bidirectional motor 504 is activated in a particular direction based upon the position of switch 502. For example, when switch 502 is closed at position A, motor 504 activates in a clockwise direction for a predetermined period of time. Likewise, when switch 502 is closed at position B, motor 504 activates in a counterclockwise direction for a predetermined period of time. The predetermined period of time is a time required for motor 504 to fully extend or retract antenna 114 that is pre-calculated based upon the actual system design constraints, such as the length of the antenna, the radius of gear 506, and the frequency of motor 504.

Motor 504 drives gear 506 in a particular direction. For example, when motor 504 spins in a clockwise direction 507, it also drives gear 506 in the clockwise direction. Likewise, when motor 504 spins in a counterclockwise direction it drives standard gear 506 in the counterclockwise direction. Standard gear 506 is a traditional, non-bevel gear.

Gear 506 drives rack 508, which attaches to antenna 114. Particularly, when gear 506 spins clockwise, rack 508 slides to the left and extends antenna 114 from protrusion 110 in direction 121. Similarly, when gear 506 spins counterclockwise, rack 508 slides to the right and retracts antenna 114 into protrusion 110. In this way, antenna 114 extends and retracts based upon an open or closed state of a flip-top wireless device.

Figure 6:
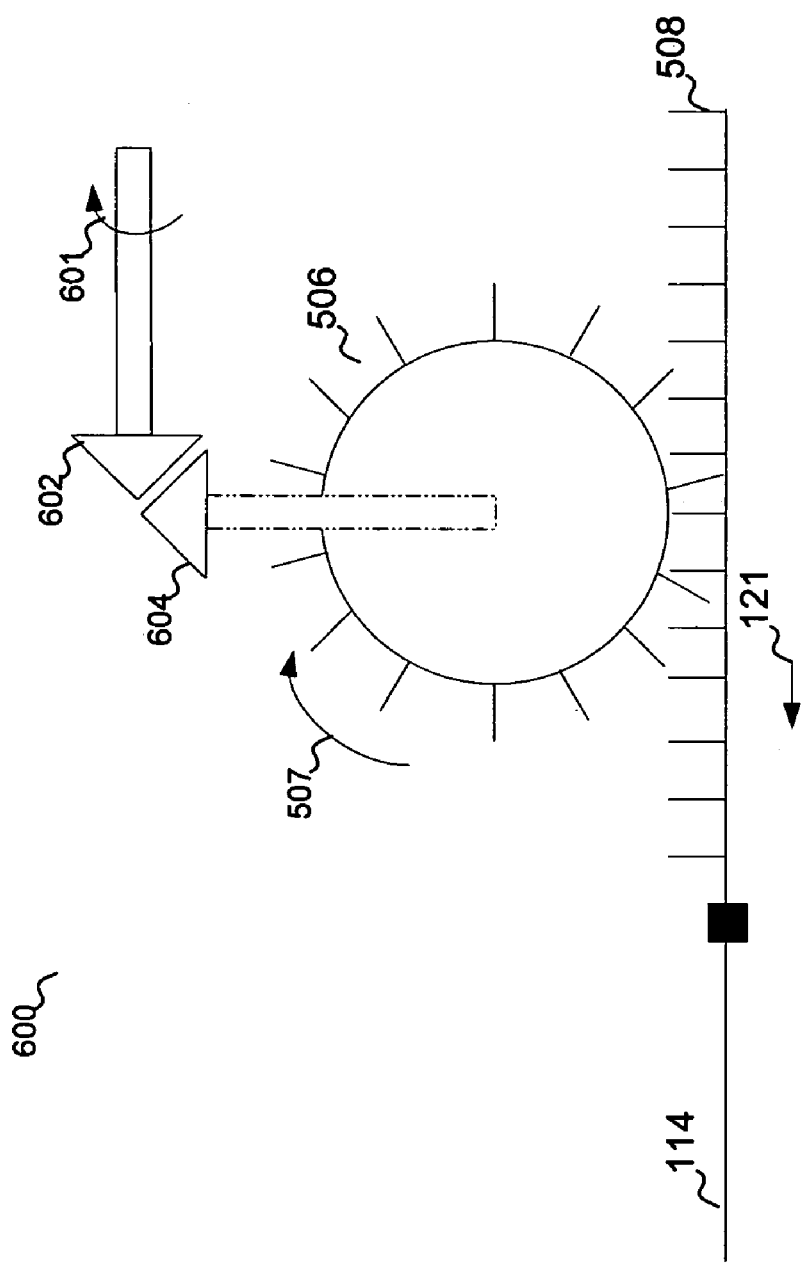
FIG. 6 is a schematic diagram showing a gear system of a wireless device according to yet another alternative exemplary embodiment of the present invention.

FIG. 6 is a schematic diagram showing a gear system of a wireless device according to yet another alternative exemplary embodiment of the present invention. Particularly, FIG. 6 shows an alternative gear system 600 for operating a wireless device with a flip top. More particularly, gear system 600 uses a gear train having beveled gears instead of a motor to extend or retract antenna 114 with movement of cover 402.

Gear system 600 includes a first bevel gear 602, a second bevel gear 604, a standard gear 506, a rack 508 and an antenna 114. When cover 402 is opened, first bevel gear 602 turns in a clockwise vertical rotation 601. For example, first bevel gear 602 is attached directly or indirectly to cover 402 so that opening and closing the cover rotates gear 601 in a clockwise and counterclockwise vertical rotation, respectively. First bevel gear 602 then drives second bevel gear 604 in a horizontal clockwise rotation 570. The use of bevel gears to change the direction of drive in a gear system by 90 degrees, as shown in FIG. 6, is known in the prior art.

Second bevel gear 604 similarly drives gear 506 in the horizontal clockwise direction. In one embodiment gear 506 is attached to the shaft of second bevel gear 604 so that gears 506 and 604 spin in the same direction. Gear 506 then drives rack 508, which attaches to antenna 114. Particularly, when gear 506 spins clockwise upon opening a flip-top wireless device, rack 508 slides to the left and extends antenna 114 from protrusion 110 in direction 121. Similarly, when gear 506 spins counterclockwise upon closing a flip-top wireless device, rack 508 slides to the right and retracts antenna 114 into protrusion 110. In this way, antenna 114 extends and retracts based upon an open or closed state of a flip-top wireless device.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A wireless device, comprising:
   a cover;
   an antenna; and
   a rack and gear system synchronizing movement of the antenna and the cover, wherein the rack and gear system further comprises:
   a first sliding front rack attached to a first side of the cover;
   a second sliding front rack attached to a second side of the cover;
   a first gear attached to the first sliding front rack;
   a second gear attached to the second sliding front rack and the first gear; and
   an antenna rack attached to the antenna and the first gear,
   wherein a movement of the cover causes the first and second sliding racks to drive the first and second gears, the first gear to drive the antenna rack.

2. The device of claim 1, wherein the cover is a sliding cover.

3. The device of claim 1, wherein the cover is a flip-top cover.

4. The device of claim 1, wherein the antenna at least partially retracts.

5. The device of claim 1, wherein the wireless device is a cellular telephone.

6. The device of claim 1, wherein the wireless device is a laptop.

7. The device of claim 1, wherein the antenna fully retracts.

8. A wireless device, comprising:
   a flip-top cover;
   an antenna;
   a rack and gear system synchronizing movement of the antenna and the cover;
   a motor to drive the rack and gear system; and
   a switch to activate the motor in a first direction when the cover is opened and to activate the motor in a second direction when the cover is closed,
   wherein the wireless device is a laptop.

9. The wireless device of claim 8, wherein the motor operates for a limited period of time to move the antenna.

10. The wireless device of claim 9, further comprising:
    a gear attached to the motor; and
    a rack attached to the gear and the antenna.

11. The wireless device of claim 8, wherein the antenna at least partially retracts and the wireless device further includes a protrusion that houses the antenna when the antenna is at least partially retracted.

12. The laptop wireless device of claim 8, wherein the antenna fully retracts.

13. A method for operating a wireless device, comprising:
    moving a cover of the wireless device;
    driving a first sliding front rack attached to a first side of the cover and a second sliding front rack attached to a second side of the cover with movement of the cover;
    driving a first gear attached to the first sliding front rack;
    driving a second gear attached to the second sliding front rack and the first gear; and
    driving an antenna rack attached to an antenna and the first gear, wherein said driving an antenna rack extends or retracts an antenna of the device.

14. The method of claim 13, wherein the cover is a sliding cover.

15. The method of claim 13, wherein the cover is a flip-top cover.

16. The method of claim 13, wherein the antenna at least partially retracts.

17. The method of claim 16, wherein the antenna is housed by a protrusion when the antenna is at least partially retracted.

18. The method of claim 13, wherein the antenna fully retracts.

19. The method of claim 13, wherein the wireless device is a cellular telephone.

20. The method of claim 13, wherein the wireless device is a laptop.

* * * * *